United States Patent
Kuhlmann et al.

(10) Patent No.: US 7,035,253 B2
(45) Date of Patent: Apr. 25, 2006

(54) COMMUNICATION TIMING COORDINATION TECHNIQUES

(75) Inventors: Martin Kuhlmann, Laguna Niguel, CA (US); Robindra B. Joshi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1050 days.

(21) Appl. No.: 10/058,509

(22) Filed: Jan. 28, 2002

(65) Prior Publication Data

US 2003/0142771 A1    Jul. 31, 2003

(51) Int. Cl.
*H04L 12/50* (2006.01)
*H04L 25/40* (2006.01)

(52) U.S. Cl. .................. 370/356; 370/516; 375/358; 375/371; 375/376

(58) Field of Classification Search ............... 370/352, 370/356, 503, 505, 516, 522; 375/362, 368, 375/371, 358, 356, 359, 372
See application file for complete search history.

(56) References Cited

U.S. PATENT DOCUMENTS

| 5,172,396 A | 12/1992 | Rose, Jr. et al. |
| 5,479,457 A | 12/1995 | Waters |

*Primary Examiner*—Afsar Qureshi
(74) *Attorney, Agent, or Firm*—McAndrews, Held & Malloy, Ltd

(57) ABSTRACT

A communication unit (30) arranged to send transmit data includes a receiver (32) arranged to recover input data transmitted at a downstream transfer rate in response to a symbol clock (20) signal. A transmitter (40) is arranged to transmit the transmit data at an upstream transfer rate in response to an upstream transmit clock signal (TX_CLKA) that is coordinated with the symbol clock signal. The frequency or repetition rate of the upstream transmit clock signal is defined at least in part by a predetermined relationship between the downstream transfer rate and the upstream transfer rate, such as a ratio of the downstream transfer rate and the upstream transfer rate.

38 Claims, 9 Drawing Sheets

COMMUNICATION TIMING COORDINATION TECHNIQUES

BACKGROUND OF THE INVENTION

This invention relates to digital telephony and more specifically relates to coordinating the transmission of data in digital telephony.

Digital telephony, the transmission of voice over digital communications systems, requires coordination of a head end unit to a remote unit. However, the reference clocks at the head end unit and remote unit are, in general, produced from asynchronous sources. For example, the reference clocks at both the head end unit and remote unit may be generated by local crystal oscillators, each of which is free running. Due to manufacturing uncertainties, the frequencies of these two oscillators (and correspondingly the head end unit and remote unit reference clocks) will not match.

There is typically a frequency offset of several hundred parts per million (ppm) between the head end clock and remote clock. In addition to a constant offset, there is the possibility of jitter on either of the generated clocks. Hence, the head end unit (also called the central office, or CO) operates at a different frequency than the remote unit (sometimes referred to as the customer premises equipment, or CPE). The frequency offset and jitter interfere with proper communication of data.

In the past, the frequency offset between the head end and remote clocks has been handled by sending both voice and non-voice data in flagged packets. Many of the packets include no voice data. The packets with both voice and non-voice data are sent with a prefix or flag that indicates the presence of voice data. In response to the flag, the receiving unit switches the voice data to a voice data buffer memory. After some voice data has been stored in the buffer memory, it is processed by voice processing circuitry. The use of a flag to indicate the presence of voice data reduces the bandwidth available for data transmission. The processing required to handle the voice data in response to the flags requires delays and expensive processing equipment. This invention addresses these problems and provides a solution.

U.S. Pat. No. 5,479,457 (Dec. 26, 1995) describes clock smoothing. However, it does not teach any clock relationships between a central office and customer premises equipment.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An exemplary apparatus form of the invention is useful in a communication unit for sending transmit data. In such an environment, the unit comprises a receiver arranged to recover input data transmitted at a first transfer rate in response to a first transmit clock signal and a transmitter arranged to transmit the transmit data at a second transfer rate in response to a second transmit clock signal coordinated with the first transmit clock signal. The second transmit clock signal comprises a frequency defined at least in part by a predetermined relationship between the first transfer rate and second transfer rate.

An exemplary method form of the invention is useful for sending transmit data. In such an environment, the method comprises recovering input data transmitted at a first transfer rate in response to a first transmit clock signal. A second transmit clock signal is generated and coordinated with the first transmit clock signal. The transmit data is transmitted in response to the second transmit clock signal at a second transfer rate. The second transmit clock signal comprises a frequency defined at least in part by a predetermined relationship between the first transfer rate and second transfer rate.

By using the foregoing techniques, coordination between head end and remote communication units can be economically maintained with a degree of precision previously not available. No flags indicating the presence of packets with voice data are required. In addition, the complexity of the requisite processing circuitry is reduced.

These and other advantages and novel features of the present invention, as well as details of an illustrated embodiment thereof, will be more fully understood from the following description and drawings.

DETAILED DESCRIPTION OF THE INVENTION

Figure 1:
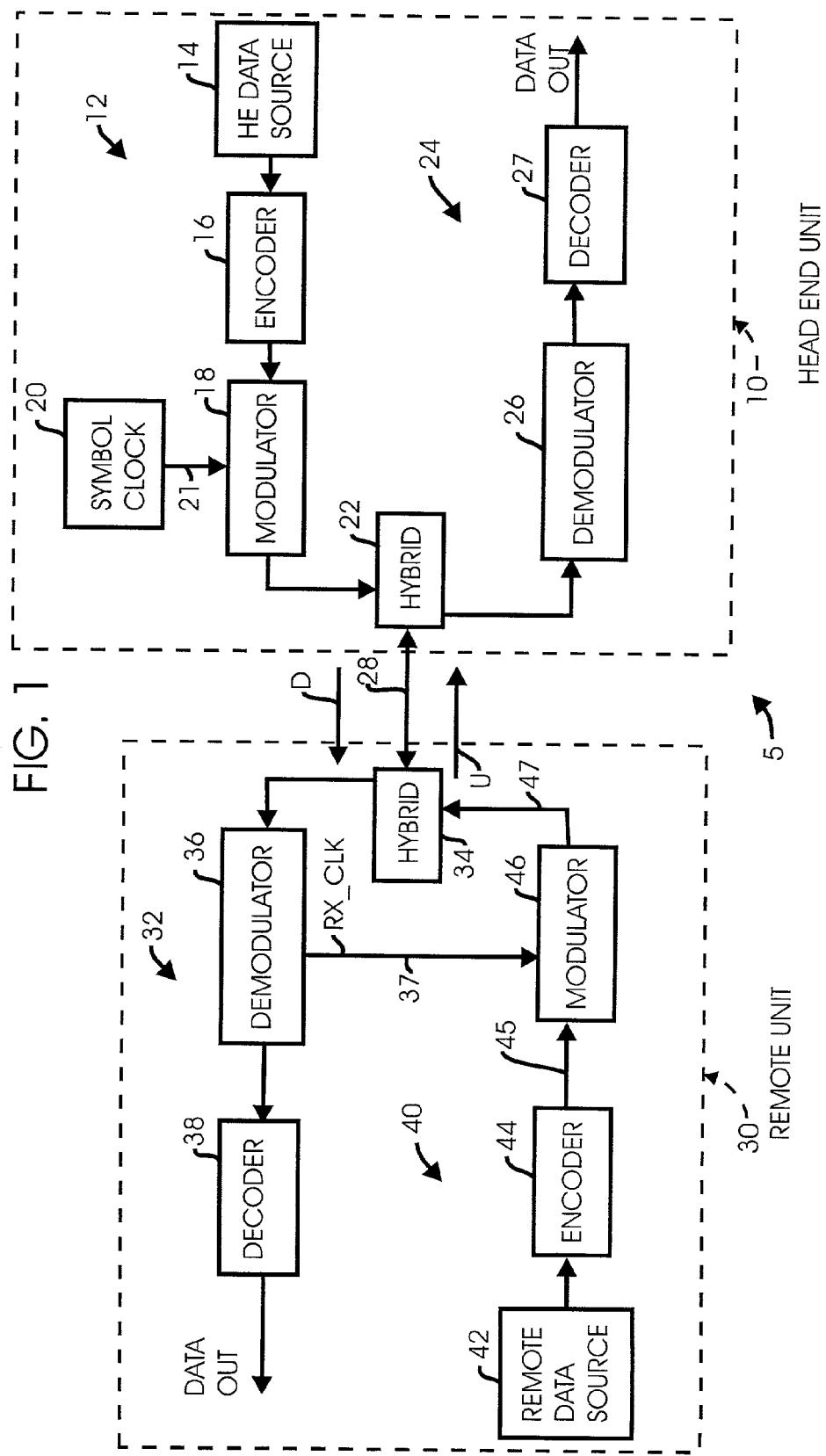
FIG. 1 is a schematic block diagram of one form of a communication system embodying the invention, including a remote unit comprising a modulator.

Referring to FIG. 1, one form of communication system in which the invention may be employed includes a digital subscriber line (DSL) system 5 employing discrete and multitone modulation (DMT) or a single carrier modulation (QAM, CAP). Such a system includes a head end unit or central office 10 employing a transmitter 12 comprising a source of head end data 14, an encoder 16 and a modulator 18. A symbol clock 20 operates at a predetermined frequency to produce a symbol transmit clock signal on a conductor 21. Modulator 18 uses the symbol transmit clock signal to modulate the data originating at source 14 with DMT or single carrier modulation. The modulated data is transmitted at a downstream transfer rate, such as 5 megabits per second (Mb/s), through a hybrid circuit 22 and a DSL communication line 28 in a downstream direction D (downstream data). The downstream transmitted data includes information about the symbol transmit clock signal. Line 28 comprises conventional telephone twisted pair conductors.

Head end unit 10 also employs a receiver 24 comprising a demodulator 26 and a decoder 27 that generates data transmitted to a utilization circuit (not shown).

A remote unit 30 employs a receiver 32 comprising a hybrid circuit 34, a demodulator 36 and a decoder 38 that generates data transmitted to a utilization circuit (not shown) in response to the received downstream data. Receiver 32 is a coherent receiver comprising an analog to digital converter (ADC) (not shown) and a loop algorithm that derives a control word (CW) from the received signal, which contains information about symbol transmit clock that is used to recover the symbol transmit clock signal generated by head end unit 10. Demodulator 36 generates a recovered clock signal RX_CLK on a conductor 37 by processing the signal received on line 28 with the downstream data from head end unit 10. The RX_CLK signal is a reconstructed version of the symbol transmit clock signal generated by symbol clock 20.

Remote unit 30 also includes a transmitter 40 comprising a remote data source 42, an encoder 44 and a modulator 46 that receives the RX_CLK signal. Modulator 46 generates upstream remote transmit data that is sent through a conductor 47, hybrid circuit 34 and line 28 to head end unit 10 in an upstream direction U (upstream data). The remote transmit data is sent at an upstream transfer rate, such as 100 kilobits per second (Kb/s) Modulator 46 uses the RX_CLK signal to generate a remote transmit clock signal that is coordinated with the symbol transmit clock signal. The frequency of the remote transmit clock signal has a predetermined relationship between the downstream transfer rate in direction D and the upstream transfer rate in direction U. For example, the frequency of the remote transmit clock signal may be proportional to a ratio of the downstream transfer rate and the upstream transfer rate. The remote transmit clock signal is used by modulator 46 to generate the upstream transmit data that is sent to head end unit 10 in direction U. The upstream remote transmit data also includes information about remote transmit clock signal.

The remote transmit data is received by hybrid circuit 22 and is sent to demodulator 26. The received signal is used by demodulator 26 to recover the remote transmit clock signal in the same manner that demodulator 36 recovers the symbol clock signal from the head end unit 10. The recovered signal is a reconstructed version of the remote transmit clock signal generated by modulator 46. As a result of this operation, the upstream data transmitted to head end unit 10 in the U direction can be demodulated and decoded with a degree of accuracy and economy previously unavailable. For example, no flags indicating packets with voice data are required.

Figure 2:
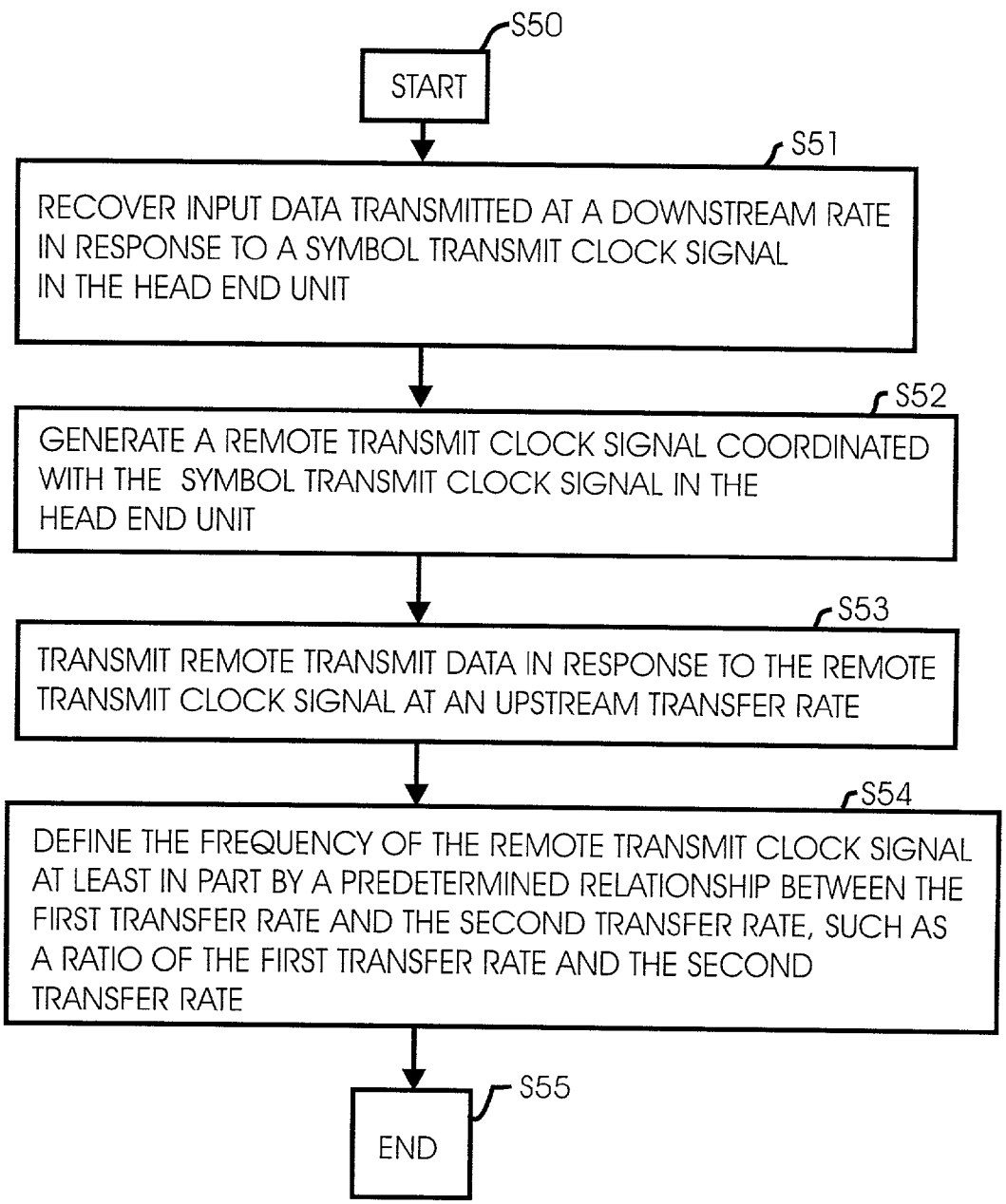
FIG. 2 is a flow diagram describing the operation of a portion of the apparatus in FIG. 1.

Referring to FIG. 2, the operation of remote unit 30 starts at step S50 and continues with step S51 in which input data transmitted at the downstream transfer rate in response to the symbol transmit clock signal on conductor 21 is recovered by receiver 32.

In step S52, modulator 46 generates a remote transmit clock signal that is coordinated with the symbol transmit clock signal on conductor 21.

In step S53, modulator 46 transmits remote transmit data in response to the remote transmit clock signal at the upstream transfer rate.

In step S54, modulator 46 defines the frequency of the remote transmit clock signal at least in part by a predetermined relationship between the downstream transfer rate and the upstream transfer rate. For example, the frequency can be determined at least in part by a ratio of the upstream transfer rate and the downstream transfer rate. The foregoing phase of the operation ends at step S55.

Figure 3:
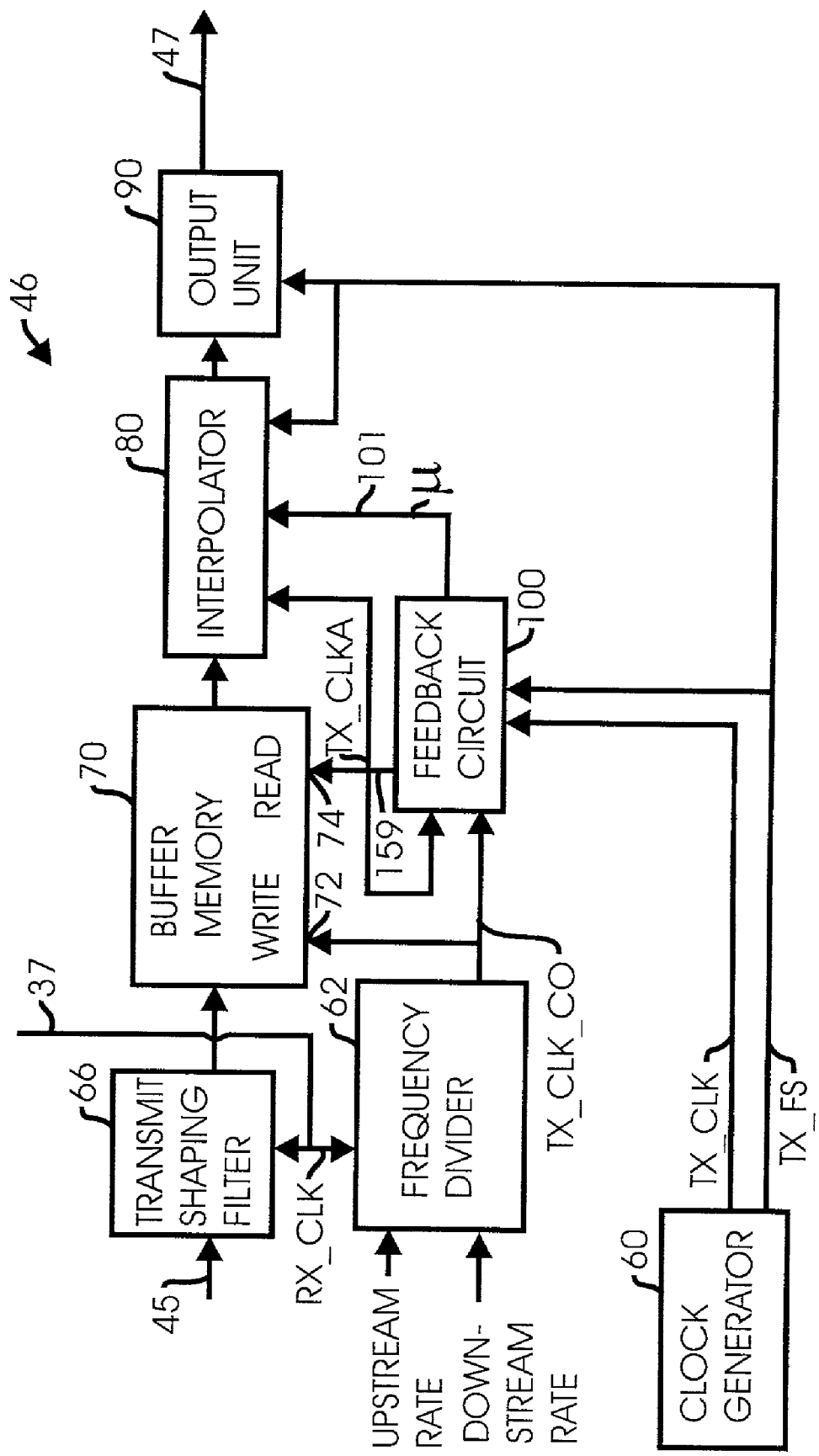
FIG. 3 is a schematic block diagram of the remote unit modulator shown in FIG. 1.

Referring to FIG. 3, modulator 46 includes a clock generator 60 that generates clock signals TX_CLK and TX_FS. As an alternative embodiment, the circuitry and loop algorithm that generates clock signal RX_CLK also may be incorporated into clock generator 60.

A frequency divider 62 is arranged to alter the RX_CLK frequency by a ratio of the downstream transfer rate and the upstream transfer rate to generate a clock signal TX_CLK_CO. More specifically, the frequency of RX_CLK is multiplied by the quantity downstream transfer rate/upstream transfer rate to generate TX_CLK_CO.

The transmit data received from encoder 44 on conductor 45 is filtered by a transmit shaping filter 66, which "shapes" the transmit data so that it is appropriately band-limited for transmission. The filter may also be used to give the transmit data certain properties, e.g., it may filter the data to make it distortion-free.

A buffer memory 70 is arranged to write the filtered and processed transmit data to the buffer memory in response to the TX_CLK_CO clock signal on a write input 72 and is arranged to read the transmit data from the buffer memory in response to a transmit clock signal TX_CLKA on a read input 74.

An interpolator 80 interpolates the transmit data so that it is appropriate for an output unit 90 arranged to place the transmit data into a form suitable for transmission in response to a sample clock signal TX_FS operating at a sample rate of, for example, 20 MHz. The rate of the TX_CLKA signal may be, for example, only half the rate of the TX_FS signal. In general, the TX_CLKA and TX_FS signals are not synchronized.

Output unit 90 comprises a digital to analog converter (DAC). The digital data is sampled by sample clock signal TX_FS.

A feedback circuit 100 is arranged to generate the transmit clock signal TX_CLKA by filtering or smoothing the TX_CLK_CO clock signal and to generate phase information U on a conductor 101 in response to the phase difference between the transmit clock signal TX_CLKA and the sample clock signal TX_FS to enable interpolation of the transmit data into a form suitable for output unit 90.

Figure 4:
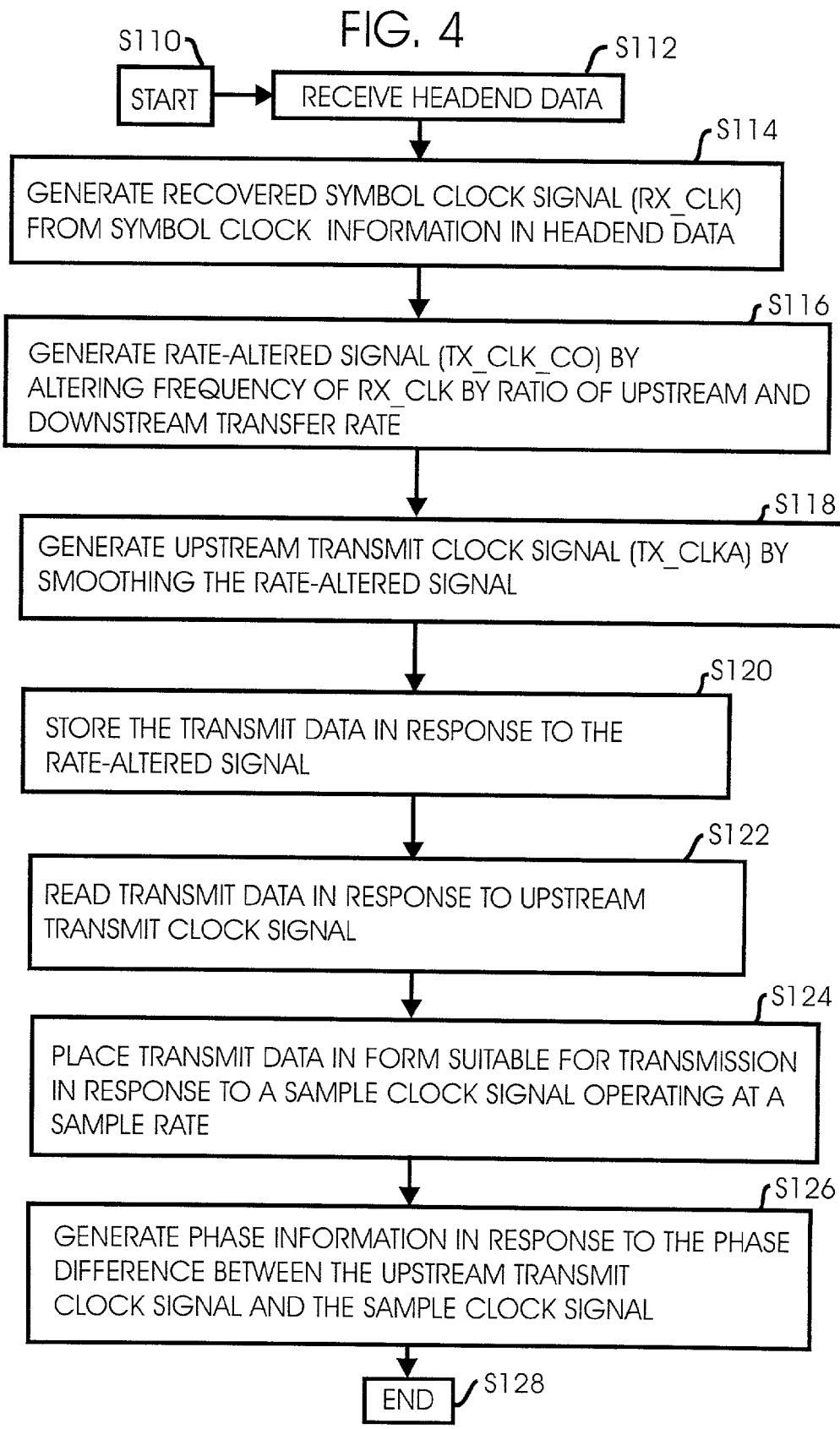
FIG. 4 is a flow diagram describing the operation of a portion of the apparatus shown in FIG. 3.

One mode of the operation of modulator 46 is described in FIG. 4. The operation starts at step S110.

In step S112, downstream data is received from head end unit 10, including information about symbol transmit clock generated on conductor 21. In step S114, demodulator 36 generates a recovered symbol clock signal RX_CLK from the symbol clock information.

In step S116, a rate-altered clock signal (TX_CLK_CO) is generated by altering the frequency of RX_CLK by a ratio of the upstream transfer rate and the downstream transfer rate.

In step S118, an upstream transmit clock signal (TX_CLKA) is generated by filtering or smoothing of the rate-altered clock signal.

In step S120, the upstream transmit data is stored in response to the rate-altered clock signal.

In step S122, the upstream transmit data is read in response to the upstream transmit clock (TX_CLKA).

In step S124, the upstream transmit data is placed in a form suitable for transmission to head end unit 10 in response to a sample clock signal (TX_FS) operating at a sample rate.

In step S126, phase information is generated in response to the phase difference between the upstream transmit clock signal (TX_CLKA) and the sample clock signal (TX_FS). This mode of the operation ends at step S128.

Figure 5:
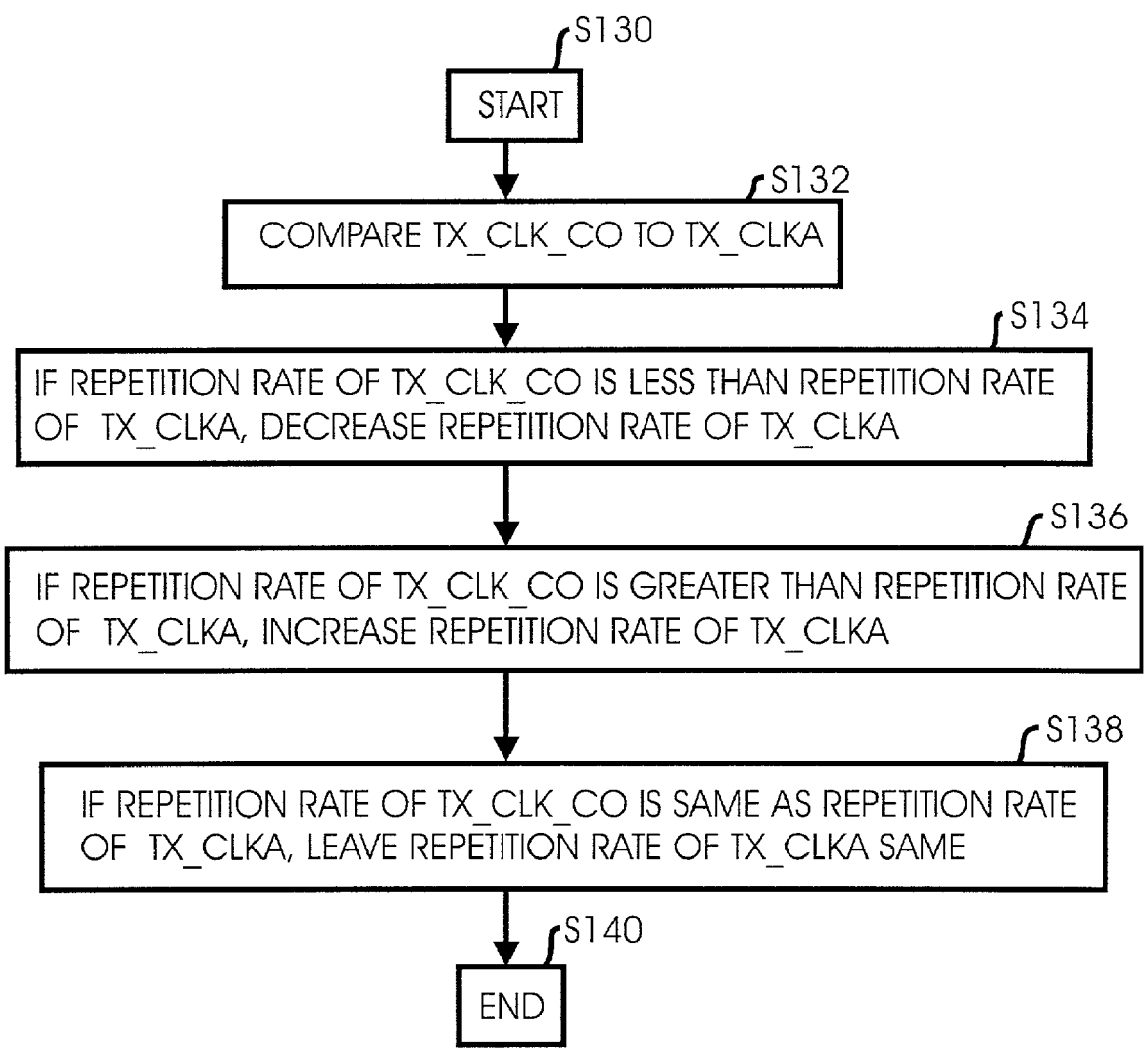
FIG. 5 is a flow diagram illustrating more detailed operation of one of the steps of operation shown in FIG. 4.

FIG. 5 illustrates additional details about the operation of step S118 shown in FIG. 4. The operation starts with step S130 and continues with step S132 in which the repetition rate (or frequency) of the rate-altered signal TX_CLK_CO is compared to the repetition rate (or frequency) of the upstream transmit clock TX_CLKA.

In step S134, if the repetition rate of TX_CLK_CO is less than the repetition rate of TX_CLKA, the repetition rate of TX_CLKA is decreased.

In step S136, if the repetition rate of TX_CLK_CO is greater than the repetition rate of TX_CLKA, the repetition rate of TX_CLKA is increased.

In step S138, if the repetition rate of TX_CLK_CO is substantially the same as the repetition rate of TX_CLKA, the repetition rate of TX_CLKA is left unchanged. This mode of operation then ends at step S140

Additional details about the embodiment shown in FIGS. 1 and 3 are provided in the following paragraphs.

The embodiment relies on the availability of an upstream transmit clock, such as TX_CLKA, at remote unit 30 that is coordinated with the symbol transmit clock of head end unit 10. The upstream transmit clock can be generated in any number of ways, and can be obtained easily under the assumption that receiver 32 is a coherent receiver. In digital telephony, receiver 32 typically recovers the head end unit 10 symbol transmit clock. This recovered symbol clock (RX_CLK) may be "locked" to the symbol transmit clock 20, and can therefore be used to generate a suitable upstream transmitter clock at remote unit 30 (e.g., by means of clock multiplication or division) which will itself be "locked" to symbol transmit clock 20. However, the recovered clock (RX_CLK) has two undesirable characteristics: 1) it is bursty (non-uniform) and 2) it is in the receiver 32 clock domain, whereas the upstream transmitter clock must be in the transmitter 40 clock domain. These issues are addressed below.

Figure 6:
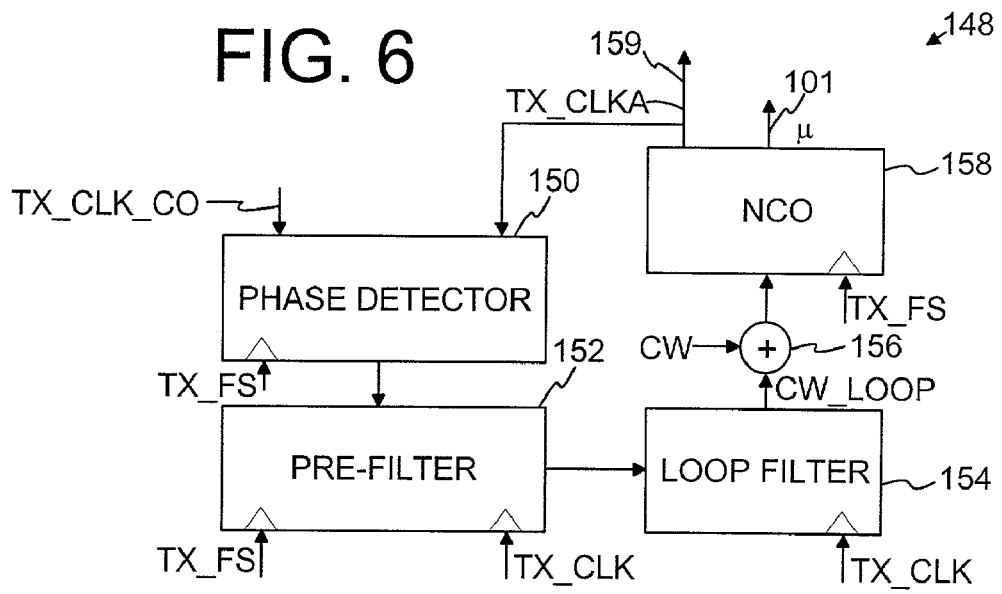
FIG. 6 is a schematic block diagram of additional details of the feedback circuit shown in FIG. 3.

FIG. 3 is a schematic block diagram of an exemplary circuit for generating an upstream transmitter clock (TX_CLKA) that is "locked" to the recovered symbol clock (RX_CLK). RX_CLK is used to create a rate-altered clock signal (TX_CLK_CO) by means of circuit 148 (FIG. 6). However, TX_CLK_CO is in the receiver 32 clock domain (RX_CLK), whereas upstream transmitter data must be in the transmitter 40 clock domain (TX_FS, or the output unit clock). Hence, data must be transferred from the RX_CLK domain (TX_CLK_CO) into the TX_FS domain. This is done by creating an additional clock signal, TX_CLKA, which is also "locked" to the rate altered signal TX_CLK_CO. Another characteristic of TX_CLKA is that it contains the phase information (μ) needed to interpolate the upstream data transmit signal to the output unit sample clock (TX_FS).

The embodiment shown in FIG. 3 uses two components to synchronize the clocks: a digital phase locked loop (PLL) shown in FIG. 6 and incorporated into feedback circuit 100 (FIG. 3), and a frequency divider 62 (FIG. 3). The frequency divider divides the repetition rate of RX_CLK by the ratio of the downstream transfer rate to the upstream transfer rate in order to generate rate-altered signal TX_CLK_CO. RX_CLK is "synchronized" to the symbol clock 20 signal by making use of the clock recovery in receiver 32. The average clock repetition rate or frequency of TX_CLK_CO is thereby "locked" to the symbol clock 20 signal. However, the rate-altered signal is bursty and noisy. The digital PLL in feedback circuit 100 is used to generate a clean upstream transmit clock signal (TX_CLKA).

Referring to FIG. 3, buffer memory 70 is a first in first out (FIFO) that guarantees a safe hand-off between the two different clock domains and proper timing coordination. Theoretically, the FIFO 70 can be placed in various locations in transmitter 40 and for this embodiment, there is no restriction on the location. However, by placing FIFO 70 in front of interpolator 80, phase information μ can be immediately used. In this embodiment interpolator 80 comprises a Variable Interpolator/Decimator (VID). The size of FIFO 70 can be determined by analyzing the burstiness of the rate-altered clock signal TX_CLK_CO. The more bursty the rate-altered clock signal, the larger the FIFO needs to be.

FIFO 70 uses the rate-altered clock signal TX_CLK_CO as a write clock and uses the smoothed upstream transmit clock TX_CLKA generated by feedback circuit 100 as a read clock.

Referring to FIG. 6, feedback circuit 100 uses a phase locked loop 148 including a phase detector 150 that measures the differences between the clock signals TX_CLK_CO and TX_CLKA. This phase difference is either pre-filtered by a pre-filter 152 or immediately fed to a loop filter 154. The loop filter filters the output of the pre-filter (or the output of the phase detector in case no pre-filter is utilized) and generates an adaptive correction term (CW_LOOP) that is summed with a fixed frequency control word, CW, by a summing circuit or algorithm 156. The sum of these two control words is fed into a numeric controlled oscillator (NCO) 158, which generates the upstream transmit clock signal TX_CLKA on a conductor 159. Additionally, NCO 158 is used to generate the phase information (μ) which is used by the variable interpolator 80 to interpolate data from the TX_CLKA domain to the TX_FS domain. The use of the phase information enables the relationship between the transmit clock signal (TX_CLKA) rate and sample signal (TX_FS) rate to be nearly arbitrary. In fact, the TX_CLKA rate and TX_FS rate must be related by some rational number, but in practice this allows a nearly unlimited choice of symbols rates with a fixed arbitrary sample rate.

To reduce the required circuit speed of loop filter 154, pre-filter 152 can be inserted at the output of phase detector 150, as shown in FIG. 6. The pre-filter (which is a small circuit) must run at the same fast speed as the phase detector, while the loop filter may operate at a much lower frequency. The loop filter may be operated at the symbol clock (TX_CLK) rate instead of the sample clock (TX_FS) rate, where TX_FS is the fast sampling clock and TX_CLKA is much slower. For example, TX_FS may be a 20 MHz clock, whereas TX_CLKA may be a 10 MHz clock.

Figure 7:
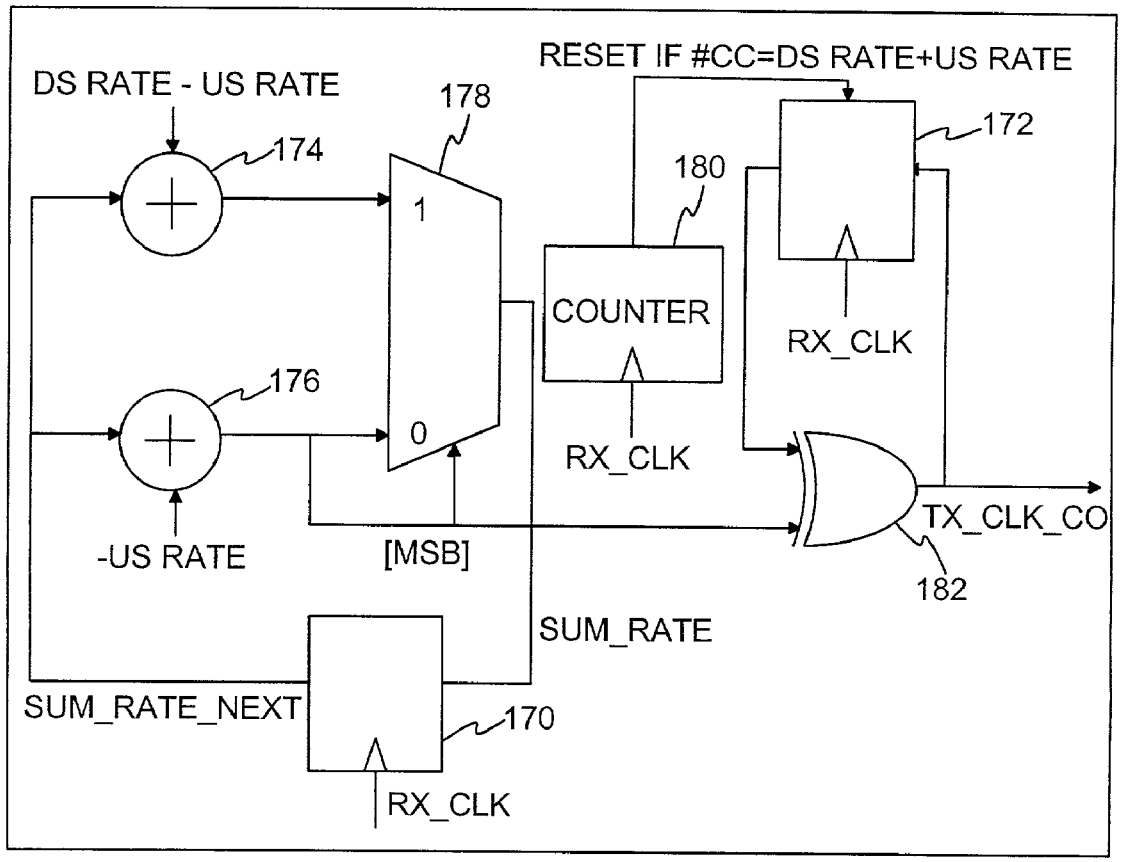
FIG. 7 is a schematic block diagram of the frequency divider shown in FIG. 6.

Referring to FIG. 7, an exemplary implementation of frequency divider 62 is shown which uses a counter-based architecture. The frequency divider comprises flip-flops 170 and 172, adders 174 and 176, a multiplexer (MUX) 178, a counter 180 and an exclusive OR gate 182. Many different types of frequency dividers may be used for divider 62. According to the FIG. 7 embodiment, the input clock RX_CLK is divided by the ratio of the downstream transfer rate (ds-rate) and the upstream transfer rate (us-rate) to generate the rate-altered clock signal TX_CLK_CO. This clock is bursty. However, it has the same average frequency as the symbol clock 20 transmit signal. To generate the signal TX_CLK_CO, the sum of the ds-rate and us-rate is added to the signal sum_rate_next in case the difference of sum_rate_next and us-rate is negative, while the difference of sum_rate_next and us_rate is chosen by MUX 178 in case the difference is positive. Note that implementation in FIG. 7 is based on 2's complement notation. However, the concept is not limited to this representation. Counter 180 counts RX_CLK clock cycles until the sum of the ds-rate and us-rate is reached and resets the output TX_CLK_CO. This can be done by XOR circuit 182, but the implementation is not limited to the use of an XOR gate.

Figure 8:
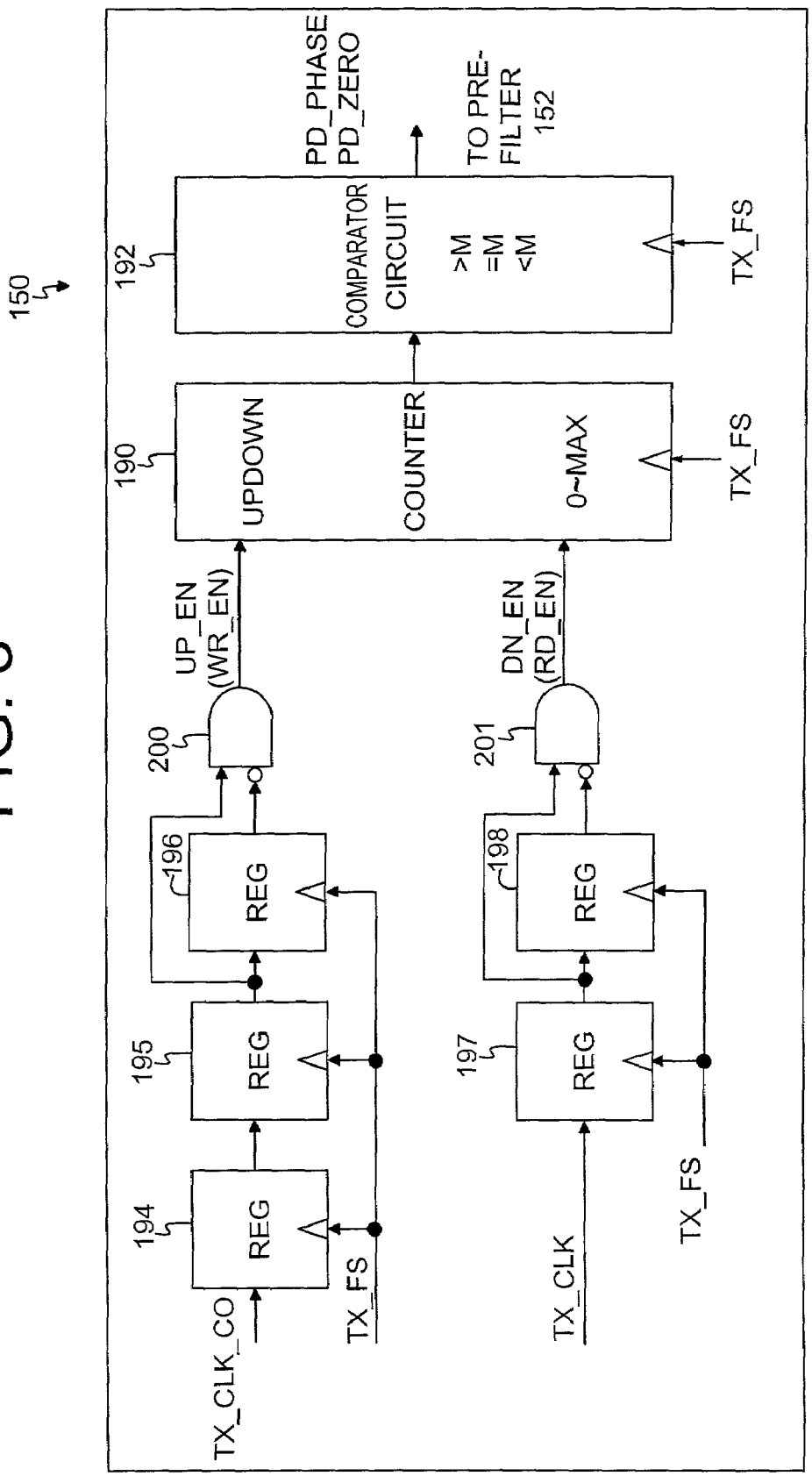
FIG. 8 is a schematic block diagram of the phase detector shown in FIG. 6.

Referring to FIG. 8, phase detector 150 detects the rising edges of the two clocks TX_CLK_CO and TX_CLKA. An up/down counter 190 increments and decrements the counter every time a positive edge of the clock TX_CLK_CO and TX_CLKA is detected, respectively. The up/down counter can be initialized to a value m, which corresponds to half the size of FIFO 70 (FIG. 3). Depending on the value (>m, =m or <m) of the counter, the outputs of the phase detector are set to their appropriate values by a comparator circuit 192 and are sent to pre-filter 152 (FIG. 6). The embodiment of FIG. 8 also includes registers 194–198 and NAND gates 200–201 connected as shown.

Figure 9:
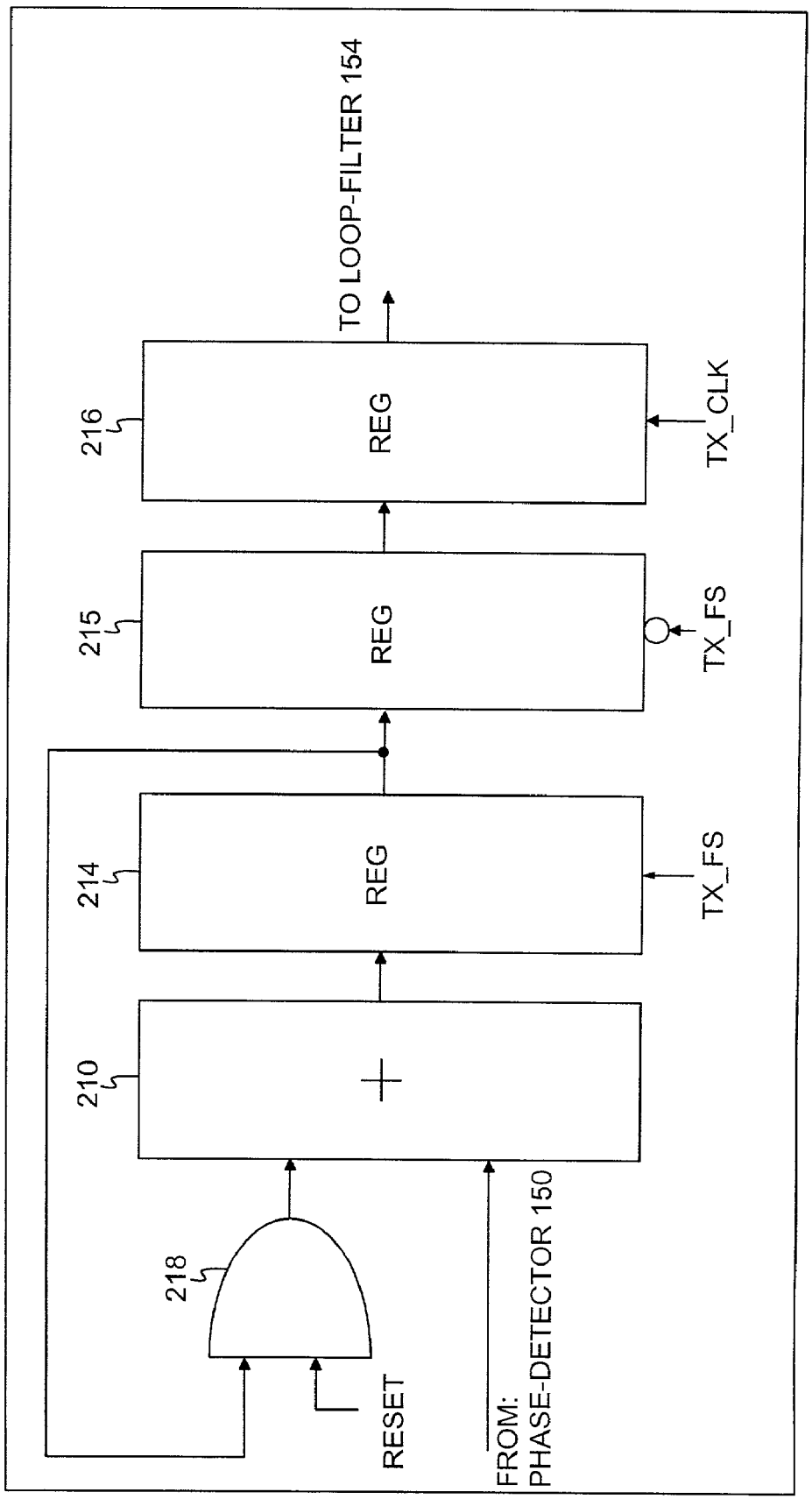
FIG. 9 is a schematic block diagram of the pre-filter shown in FIG. 6.

Referring to FIG. 9, an exemplary embodiment of pre-filter 152 is illustrated, which reduces the required clock speed of loop filter 154. The inputs from the phase detector arrive at a clock speed of TX_FS and are accumulated in an accumulator 210. The output of the pre-filter can be saturated to any chosen bit-width. However, the smaller the number of output bits, the slower the clock exactly "synchronizes" to the rate-altered clock signal TX_CLK_CO. A slower clock like TX_CLKA can be used to latch the data to the loop filter. Pre-filter 152 also comprises registers 214–216 and an OR gate 218 connected as shown.

Figure 10:
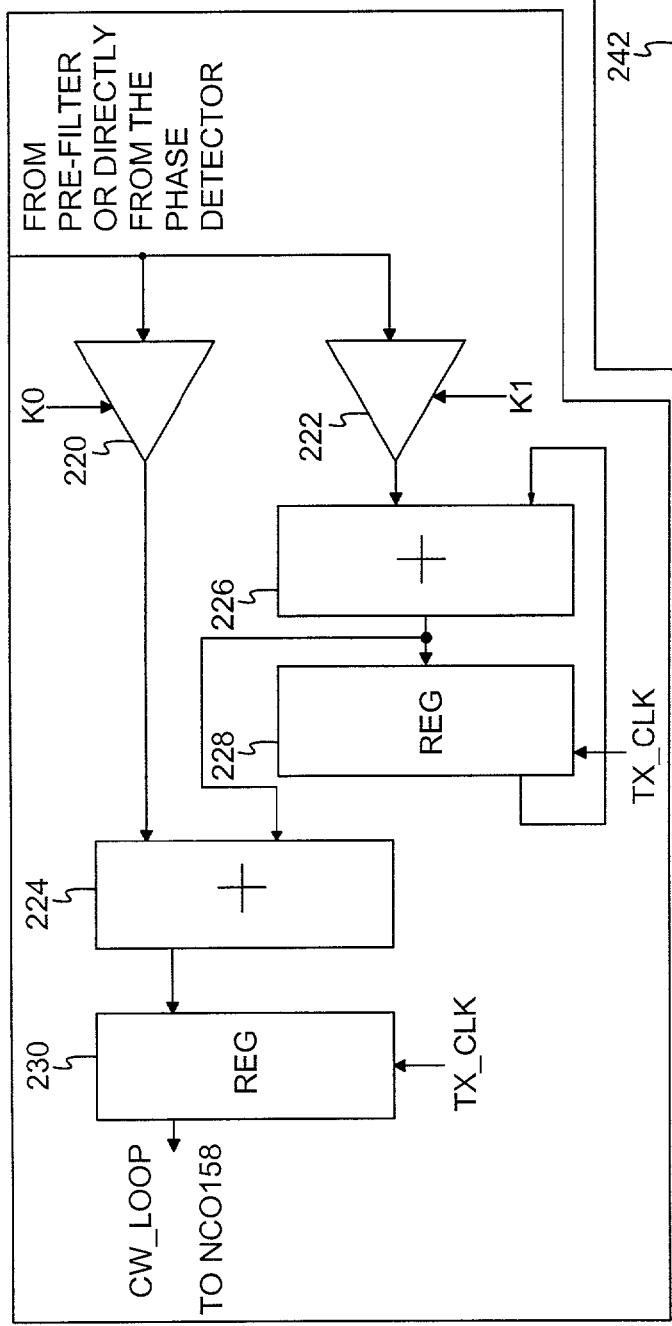
FIG. 10 is a schematic block diagram of loop filter shown in FIG. 6.

An exemplary embodiment of loop filter 154 is illustrated in FIG. 10. Loop filter 154 receives the output of pre-filter 152 or the output of the phase detector 150 directly in case no pre-filter is used. Loop filter 154 filters the data received at its input. In general, there is no restriction on the order of the loop filter. In FIG. 10, a second order loop filter is shown. The inputs are multiplied by the linear and integrator coefficients K0 and K1, respectively, in integrator multipliers 220 and 222. The outputs of the integrator multipliers are fed into accumulators 224 and 226 and added to the outputs of the linear coefficient multipliers. Accumulator 226 cooperates with a register 228. The output of the loop filter from a register 230 is used as an additional input control word (CW_LOOP) to NCO 158.

Figure 11:
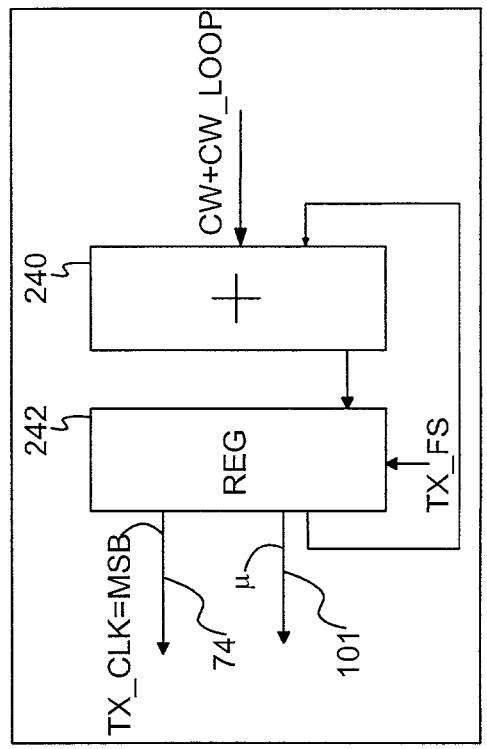
FIG. 11 is a schematic block diagram of the numeric controlled oscillator (NCO) shown in FIG. 6.

FIG. 11 illustrates an exemplary form of NCO 158. The output of the loop filter is fed to NCO 158 through summer 156 (FIG. 6). The sum of the two control words CW and CW_LOOP is used to control NCO 158. In case an overflow in an accumulator 240 occurs, the most significant bit (msb) of a register 242 is set to one. This msb bit corresponds to the clock TX_CLKA while the phase information μ corresponds to the less significant bits of the output of the accumulator. For example, if register 242 is a 32 bit register representing bits 0–31, bit 0 corresponds to the msb and bits 1–12 correspond to phase information μ. The phase information is typically 8–12 bits in a 32 bit system.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A communication unit for sending transmit data comprising:
   a receiver arranged to recover input data transmitted at a first transfer rate in response to a first transmit clock signal; and
   a transmitter arranged to transmit the transmit data at a second transfer rate in response to a second transmit clock signal coordinated with the first transmit clock signal, said second transmit clock signal comprising a frequency defined at least in part by a predetermined relationship between the first transfer rate and second transfer rate.

2. The unit of claim 1 wherein the predetermined relationship comprises a ratio of the first transfer rate and second transfer rate.

3. The unit of claim 1 wherein the input data comprises clock information about the first transmit clock signal, wherein the receiver generates a reconstructed first transmit clock signal in response to the clock information and wherein the transmitter generates the second transmit clock signal in response to the reconstructed first transmit clock signal.

4. The unit of claim 3 wherein the transmitter comprises:
   a clock generator arranged to generate the reconstructed first transmit clock signal with a first frequency in response to the clock information;
   a frequency divider arranged to alter the first frequency by a ratio of the first transfer rate and the second transfer rate to generate a rate-altered clock signal;
   a buffer memory arranged to write the transmit data to the buffer memory in response to the rate-altered clock signal and arranged to read the transmit data from the buffer memory in response to the second transmit clock signal;
   an output unit arranged to place the transmit data into a form suitable for transmission in response to a sample clock signal operating at a sample rate; and
   a feedback circuit arranged to generate the second transmit clock signal by reducing errors of the rate-altered clock signal and to generate phase information in response to the phase difference between the second transmit clock signal and the sample clock signal to enable interpolation of the transmit data into a form suitable for the output unit.

5. The unit of claim 4 wherein the sample clock signal is unsynchronized with respect to the second transmit clock signal.

6. The unit of claim 5 wherein the output unit samples the transmit data in response to the sample clock signal.

7. The unit of claim 6 wherein the feedback circuit comprises:
   a phase detector arranged to generate a phase difference signal representing the phase difference between the rate-altered clock signal and the second transmit clock signal in response to the sample clock signal;
   a filter arranged to filter the phase difference signal in response to the second transmit clock signal and the sample clock signal; and
   a numerically-controlled oscillator arranged to generate the second transmit clock signal and the phase information in response to the phase difference signal and the sample clock signal.

8. The unit of claim 7 wherein the phase information enables interpolation of the transmit data from the domain of the second transmit clock signal to the domain of the sample clock signal so that the relationship between the first transfer rate and the sample rate is substantially arbitrary.

9. The unit of claim 8 wherein the feedback circuit is responsive to the sample clock signal.

10. The unit of claim 9 wherein the output unit comprises a digital to analog converter.

11. The unit of claim 4 wherein the output unit comprises a digital to analog converter.

12. The unit of claim 4 wherein the feedback circuit comprises a phase locked loop.

13. The unit of claim 12 wherein the phase locked loop comprises:
a phase detector arranged to generate a phase difference signal representing the phase difference between the rate-altered clock signal and the second transmit clock signal;
a filter arranged to filter the phase difference signal; and
a numerically-controlled oscillator arranged to generate the second transmit clock signal and the phase information in response to the phase difference signal.

14. The unit of claim 13 wherein the filter comprises:
a pre-filter arranged to operate at a first speed; and
a loop filter arranged to operate at a second speed less than the first speed.

15. The unit of claim 4 wherein the buffer memory comprises a first in first out memory.

16. The unit of claim 4 wherein the average repetition rate of the rate-altered clock signal is substantially the same as the first frequency altered by a ratio of the first transfer rate and the second transfer rate.

17. The unit of claim 4 wherein the feedback circuit decreases the repetition rate of the second transmit clock signal if the repetition rate of the rate-altered clock signal is less than the repetition rate of the second transmit clock signal and wherein the feedback circuit increases the repetition rate of the second transmit clock signal if the repetition rate of the rate-altered clock signal is greater than the repetition rate of the second transmit clock signal.

18. The unit of claim 1 wherein the first transfer rate is greater than or equal to the second transfer rate.

19. The unit of claim 1 wherein the first transfer rate is less than the second transfer rate.

20. A method of sending transmit data comprising:
recovering input data transmitted at a first transfer rate in response to a first transmit clock signal;
generating a second transmit clock signal coordinated with the first transmit clock signal; and
transmitting the transmit data in response to the second transmit clock signal at a second transfer rate, said second transmit clock signal comprising a frequency defined at least in part by a predetermined relationship between the first transfer rate and second transfer rate.

21. The method of claim 20 wherein the predetermined relationship comprises a ratio of the first transfer rate and second transfer rate.

22. The method of claim 20 wherein the input data comprises clock information about the first transmit clock signal, wherein said recovering input data comprises generating a reconstructed first transmit clock signal in response to the clock information and wherein said generating a second transmit clock signal comprises generating the second transmit clock in response to the reconstructed first transmit clock signal.

23. The method of claim 22 wherein said transmitting the transmit data comprises:
generating the reconstructed first transmit clock signal with a first frequency in response to the clock information;
altering the first frequency by a ratio of the first transfer rate and the second transfer rate to generate a rate-altered clock signal;
generating the second transmit clock signal by reducing errors of the rate-altered clock signal;
storing the transmit data in response to the rate-altered clock signal;
reading the stored transmit data in response to the second transmit clock signal;
placing the transmit data into a form suitable for transmission in response to a sample clock signal operating at a sample rate; and
generating phase information in response to the phase difference between the second transmit clock signal and the sample clock signal to enable interpolation of the transmit data into a form suitable for transmission.

24. The method of claim 23 wherein the sample clock signal is unsynchronized with respect to the second transmit clock signal.

25. The method of claim 24 wherein said placing the transmit data into a form suitable for transmission comprises sampling the transmit data in response to the sample clock signal.

26. The method of claim 25 wherein said generating the second transmit clock signal comprises:
generating a phase difference signal representing the phase difference between the rate-altered clock signal and the second transmit clock signal in response to the sample clock signal;
filtering the phase difference signal in response to the second transmit clock signal and the sample clock signal; and
generating the second transmit clock signal and the phase information in response to the phase difference signal and the sample clock signal.

27. The method of claim 26 wherein the phase information enables interpolation of the transmit data from the domain of the second transmit clock signal to the domain of the sample clock signal so that the relationship between the first transfer rate and the sample rate is substantially arbitrary.

28. The method of claim 27 wherein said generating the second transmit clock signal comprises generating the second transmit clock signal in response to the sample clock signal.

29. The method of claim 28 wherein said placing the transmit data into a form suitable for transmission comprises converting the transmit data from digital to analog form.

30. The method of claim 23 wherein said placing the transmit data into a form suitable for transmission comprises converting the transmit data from digital to analog form.

31. The method of claim 23 wherein said generating the second transmit clock signal comprises generating the second transmit clock signal by using a phase locked loop.

32. The method of claim 31 wherein said using a phase locked loop comprises:
generating a phase difference signal representing the phase difference between the rate-altered clock signal and the second transmit clock signal;
filtering the phase difference signal; and generating the second transmit clock signal and the phase information in response to the phase difference signal.

33. The method of claim 32 wherein said filtering comprises:
pre-filtering at a first speed; and
loop filtering at a second speed less than the first speed.

34. The method of claim 23 wherein said storing and reading comprise reading the transmit data in the order of the storing.

35. The method of claim 23 wherein the average repetition rate of the rate-altered clock signal is substantially the same as the first frequency altered by a ratio of the first transfer rate and the second transfer rate.

36. The method of claim 23 wherein said generating the second transmit clock signal comprises:

decreasing the repetition rate of the second transmit clock signal if the repetition rate of the rate-altered clock signal is less than the repetition rate of the second transmit clock signal; and increasing the repetition rate of the second transmit clock signal if the repetition rate of the rate-altered clock signal is greater than the repetition rate of the second transmit clock signal.

37. The method of claim 20 wherein the first transfer rate is greater than or equal to the second transfer rate.

38. The method of claim 20 wherein the first transfer rate is less than the second transfer rate.

* * * * *